US010082782B2

(12) United States Patent
Walker et al.

(10) Patent No.: US 10,082,782 B2
(45) Date of Patent: Sep. 25, 2018

(54) SYSTEM FOR DISPLAYING AND MONITORING PRACTICAL DATA IN CONTROLLERS

(75) Inventors: David R. Walker, New Port Richey, FL (US); Goran Igic, New Port Richey, FL (US); Thomas A. Moulton, New Port Richey, FL (US); David A. White, New Port Richey, FL (US)

(73) Assignee: FACTS Engineering, LLC, New Port Richey, FL (US)

( * ) Notice: Subject to any disclaimer, the term of this patent is extended or adjusted under 35 U.S.C. 154(b) by 1370 days.

(21) Appl. No.: 11/848,074

(22) Filed: Aug. 30, 2007

(65) Prior Publication Data

US 2009/0064026 A1    Mar. 5, 2009

(51) Int. Cl.
*G05B 19/05* (2006.01)
(52) U.S. Cl.
CPC .. *G05B 19/058* (2013.01); *G05B 2219/14008* (2013.01); *G05B 2219/14073* (2013.01)
(58) Field of Classification Search
USPC .............................................. 715/772; 710/1
See application file for complete search history.

(56) References Cited

U.S. PATENT DOCUMENTS

| 5,225,975 | A * | 7/1993 | Gates et al. ..................... 700/18 |
| 5,819,112 | A * | 10/1998 | Kusters ........................... 710/36 |
| 6,308,231 | B1 * | 10/2001 | Galecki et al. .................. 710/72 |
| 6,560,557 | B1 * | 5/2003 | Carnahan et al. ............. 702/122 |
| 6,832,271 | B1 * | 12/2004 | Ivan ..................... H04L 43/0817 709/223 |
| 2002/0156926 | A1 * | 10/2002 | Batke et al. .................... 709/250 |
| 2002/0169825 | A1 * | 11/2002 | Hougland et al. ............. 709/203 |
| 2004/0189495 | A1 * | 9/2004 | Wu ......................... G05B 19/05 341/99 |
| 2004/0254648 | A1 * | 12/2004 | Johnson et al. .................... 700/1 |
| 2005/0203649 | A1 * | 9/2005 | Martin et al. .................... 700/87 |
| 2006/0091877 | A1 * | 5/2006 | Robinson ............. G01R 21/133 324/76.11 |
| 2007/0073419 | A1 * | 3/2007 | Sesay .............................. 700/18 |
| 2007/0203676 | A1 * | 8/2007 | Jinzenji et al. ................ 702/189 |

OTHER PUBLICATIONS

ControlGlobal.com article entitled "PLCs and Industrial PCs mergin identities" by Rich Merritt Nov. 9, 2005 http://www.controlglobal.com/articles/2006/019. html?page=full.*
ProSoft TEchnology "In-Rack PC with Data Historian".*
AutomationDirect, DL05 and DL06 PLCs, Nov. 09, 2005, Automationdirect, p. 1-17.*
Dieter Bauerfeind, easy500, easy700 Control Relay, May, 2004, Moeller, 05/04 edition, pp. 1-304.*

(Continued)

*Primary Examiner* — Justin S Lee
(74) *Attorney, Agent, or Firm* — Michael L. Greenberg, Esq.; Greenberg & Lieberman, LLC

(57) ABSTRACT

A device that provides for the non-invasive data monitoring of analog IO of a Programmable Logic Controller (PLC) system. The output is ultimately displayed on an interface in real-time and is measured directly from the IO channel. This type of device allows the accurate reading and analysis of errors and erroneous data within a device and transmission of said data to disparate secondary devices for use.

1 Claim, 3 Drawing Sheets

(56) References Cited

OTHER PUBLICATIONS

Bauerfeind, Dieter, User Manual easy500, easy700 Control Relay, Moeller, pp. 1-305.*
ProSoft Technology "In-Rack PC with Data Historian", Apr. 8, 2008, pp. 1-3 (Year: 2008).*
Bauerfeind, Deiter, User Manual easy 500, easy 700 Control Relay, May, 2004, Moeller, pp. 1-305 (Year: 2004).*
http://en.wikipedia.org/wiki/Programmable_automatIon_controller.

* cited by examiner

SYSTEM FOR DISPLAYING AND MONITORING PRACTICAL DATA IN CONTROLLERS

FIELD OF THE INVENTION

The present invention relates to a device that provides for the non-invasive data monitoring of analog IO of a Programmable Logic Controller (PLC) system. The output is ultimately displayed on the display interface in real-time and is measured directly from the IO channel.

BACKGROUND OF THE INVENTION

PLCs are important and necessary elements when working with automated industrial processes. A major driving force in industry and thus the economy as a whole rests with industrial output. The front line of industry can then be regarded as the factories, where automated systems help mass-produce numerous products on assembly lines and other like systems. In order to accomplish industrial goals, it is crucial that the automation is controlled properly. Making this even more important is the fact that factories often feature dusty and extreme temperature conditions that can interfere with computers and other systems.

At the heart of this automation is the PLC. The general PLC is designed to withstand such conditions inside the factory in order to create a more effective automated environment. The PLCs function is to utilize hardware and software capabilities to basically control the automated process. A central processing unit (CPU) generally interfaces with an input/output system (I/O module) to ultimately engage the controlling process through the additional use of sensors, switches and other devices. The output of this interaction within the PLC is crucial as timing, voltage, current and other factors must be at specification to properly control the automation process. Basically, if an output result is not responded to in a certain amount of time, the control will be off and thus will cause the entire overall automation process to be off and not in proper control.

In addition, analog I/O modules are vitally important to industry as these elements of the PLCs are relied upon to measure dimensions and other such significant elements as motion, pressure and temperature. In this regard, there is a significant need for a monitoring system that can directly and easily monitor the units of voltage and other factors. In its most basic sense, this type of monitoring is used to ensure that everything is working properly.

Currently, most designs require meters or additional computer connections to determine whether the controller and consequently the entire automation is running properly. These meters and additional computers employ a process where the PLC output gleaned from the sensors and I/O modules read the output for an item such as voltage. However, the meter and additional computer approaches require costly and invasive methods that delay the overall monitoring process. In addition, the meter and additional computer approach often require that parts be taken out of the overall component and transferred to the external monitoring device. This creates more issues as it can affect the quality of this vital reading. For example, a meter used to decipher digital output can actually cause a reading to change when placed near the circuits. Even a slight change in the reading can cause costly problems for the overall automation. It should be noted that removing covers and moving cables could affect monitoring. Current display methods involve this type of invasive activity, which perpetuates inherent issues of skewed data. Because of these factors, there is a substantial need for a display and monitoring method that is non-invasive. By satisfying this need of a non-invasive monitoring method such as is the case with the present invention, controllers and industrial automation in general will greatly benefit from this added safeguard related to the fact that a user can simply read the data without adversely affecting with vital elements of the control system.

Recognizing the importance of constant monitoring, some have incorporated attempts at providing better monitoring devices to the analog I/O modules. For example, light-emitting diodes (LED) have been attached that illuminate as an alarm system when something such as voltage output is outside a desired range. However, this alarm system merely issues an alert and does not eliminate the typical requirement to intervene with the functionality of the PLC in order to establish a meter or additional computer for an output reading.

Currently, there is no way for a person in real-time to physically view an analog I/O module and determine exactly what is being sent to the CPU of the PLC. Thus, there is a need for a device that contains a LCD-type element that actively displays what has been converted and sent to the CPU in real-time. This need is substantial because a device such as the present invention will allow a person to see the exact condition of the analog I/O module at any given time. This then will eliminate all the extraneous steps that are currently undertaken. This need is established with the present invention because a user can use the present invention to view the digital data in counts, as well as in engineering units. By satisfying this need, automated industry will significantly benefit through the much more cost-effective and increased monitoring of the analog I/O module output.

U.S. Pat. No. 5,640,099 issued to Sanada on Jun. 17, 1997, is a method and apparatus for detecting a short circuit point between wiring points of a device. Unlike the present invention, Sanada employs costly elements such as laser beams to merely detect deficiencies and does not convert conditions such as voltage and temperature into digital data.

U.S. Pat. No. 5,058,052, issued to Sexton et al on Oct. 15, 1991, is a method for checking for errors in a PLC based on a predetermined list of possible deficiencies to be concerned about. When a deficiency is discovered, an error alert commences to inform a user that there may be a problem with the control. Unlike the present invention, Sexton is a relatively costly endeavor in that it integrates merely an alert mechanism to inform a user of a deficiency. The user must then take additional and invasive steps to determine the exact issue with the PLC instead of having the opportunity to quickly read a real-time display to determine the exact deficiency, as is the case with the present invention.

There is a distinct need to quickly and accurately detect output deficiencies in PLCs due to the strict timing and often rough conditions associated with the control of automated industrial elements. While alert methods certainly have the ability to let a user know of a problem, the fact remains that the problem either has already occurred or time must be taken to determine what exactly the problem is. A related issue to these alert methods is that they become costly in both additional material and time as an investigation of the potential deficiency is investigated. Thus, there is a need for a non-invasive device that can always be available to convert and send voltage or current signal into digital data counts or engineering units to the CPU and display them in real-time.

The present invention satisfies that need and is significant in that it provides a cost-effective and practical method for quickly monitoring the progress of the controller output relating to an analog I/O module. At the same time, the present invention also is unique in the fact that it allows a user to monitor data without having to potentially compromise the results—even just a tiny bit—because of the non-invasive method of display.

Moreover, the present invention allows for the proper verification of a system at any time and in real-time without the invasive need for fiddling with internal parts or cables. At the same time, most other PLC displays rely on intermediate elements throughout the system to complement the function relating to the invasive methods of monitoring. Beyond the typical invasive problems, these intermediate systems sometimes interfere with the regular flow and process of the data. This problem sometimes leads to the corruption of data. The present invention, however, solves this problem by directly connecting the I/O card to the display interface. This essentially cuts out the negative effects of these intermediate elements while also sparing the monitoring system of potentially data-skewing invasive procedures. For these reasons, there is a substantial need for the present invention.

SUMMARY OF THE INVENTION

The present invention is a non-invasive method that permits a user to monitor vital information relating to a PLC by viewing a display interface. The display interface is directly connected to an I/O card. This distinction over other relevant inventions is crucial because the present invention does not alter any system to which it is connected whatsoever, whereas other monitoring inventions actually affect the system to which they are connected, modifying such systems or changing system data. In other inventions, the analysis/monitoring device can have its own errors, making analysis of a problem in the system difficult at best. In the present invention, there is a direct interface to each section of the system to which it is connected, and as such the user only is looking at true data from the system that is not marred by any errors of the present invention.

This vital information includes voltage input/output, current input/output, pressure and temperature. These elements of the automation process are detected via sensors built into the overall system. The analog I/O module of the PLC, meanwhile, converts the output gleaned from these sensors into a digital value as it sends the information to the CPU. The present invention is non-invasive so that it can easily be used without having to delve deeper into the PLC system. Instead, the data is compiled in real-time and transferred via the I/O card to the display interface. The user may then scroll through various menu options to determine and ultimately view desired data.

The present invention is a method that employs a display interface, preferably but not limited to LCD, to actively and in real-time display exact information of what has been converted from the I/O card and sent to the CPU. In this manner, a user can instantly learn what the analog I/O module is doing at any given moment. This allows for instant reaction if the user needs to correct a potential deficiency.

The LCD of the present invention displays the value of the specific unit of measure being used at any given moment. This allows for the user to see digital data counts as well as engineering units such as volts, milliamps and temperature.

In an embodiment of the present invention, only one button is needed to view the relevant data. In addition, the LCD of the present invention permits the user to view multiple channels at one time. These elements of the present invention result in a cost-effective method of instant knowledge relating to the analog I/O output.

BRIEF DESCRIPTION OF THE PREFERRED EMBODIMENT

DETAILED DESCRIPTION OF THE PREFERRED EMBODIMENT

Figure 1:
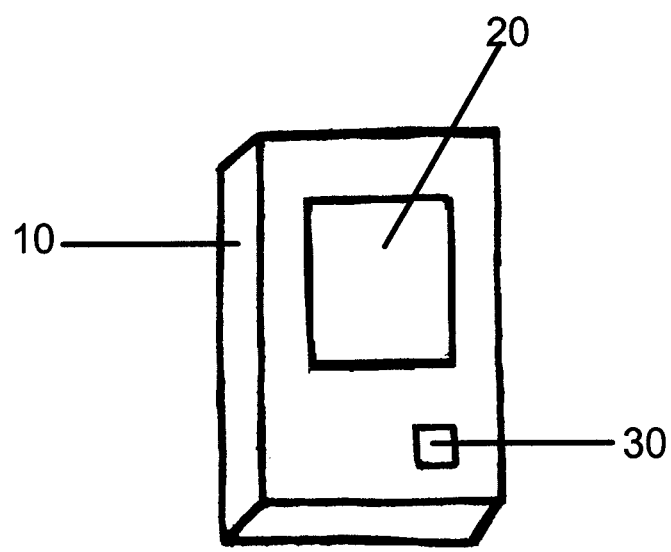
FIG. 1 is a front view of the display interface (20) of the present invention.

FIG. 1 gives us a view of the display interface (20), as it is located on the panel display casing (10). The display interface (20) as seen in FIG. 1 serves to display text in real-time. This text displays everything ranging from the initial self-test upon powering up to fault messages. Beyond those functions, the display interface (20) provides real-time numbers and text so that the user can instantly learn various conditions of the PLC. For example, a user monitoring the display interface (20) can view and instantly comprehend the data moving to the CPU because it also appears on the display interface (20) in engineering terms and/or relevant data counts. This means that a user may simply read the output emanating from the PLC where he or she can quickly deduce exactly what is going on with the output and consequently, with the entire automation operation.

In addition, FIG. 1 shows that the display interface (20) is protected and surrounded by a panel display casing (10). There is no need to make invasive movements into the panel display casing (10) because all data is may be automatically displayed in real-time on the display interface (20). Moreover, one aspect that minimizes cost and complexity in regard to the present invention is the panel button (30). Only one panel button (30) is necessary for a user to navigate the varying areas of relevant interest in regard to what is read on the display interface (20). After powering up the overall device, the panel button (30) can function as the sole navigational tool for the display interface (20).

For example, if a user wants to view data in voltage units, the user would click and hold down the panel button (30) as the display interface (20) scrolls through various primary menu items such as setup and display. Once the user reaches a menu item that he or she would like to move forward with, the user simply releases the panel button (30). Once the panel button (30) is released by the user, the display interface (20) displays secondary screens serving as sub-displays to the primary menu item that was selected by releasing the panel button (30). If the user wishes to view data in voltage units, then he or she would release the panel button (30) from the primary menu scroll on the "display"—"units"—"+/−V"—"mA,V." By releasing the panel button (30) at this point, the display interface (20) will allow the user to view the secondary display screen where the user will press the panel button (30) each time he or she wishes to scroll to a new secondary display item. Ultimately, in the example above, the user will press and release the panel button (30) until the relevant voltage units are being displayed in real-time. It is the ability of the panel button (30) to effectively navigate through the various menus and text options of the LCD panel display (20) that saves space and becomes more efficient.

Figure 2:
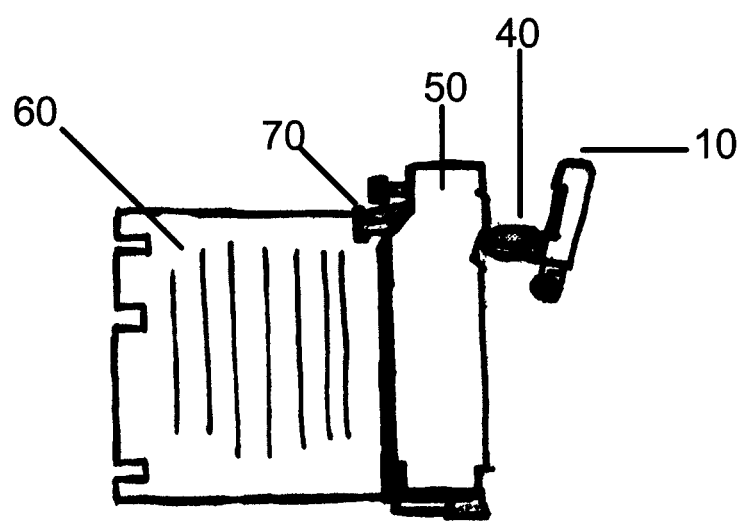
FIG. 2 is a top view of the display interface (20) of the present invention

In FIG. 2, we see a top view of the present invention in terms of placement of the panel display casing (10) in relation to the PLC casing (50). The display interface (20) is directly connected to the I/O card (60) through conventional means. The reason the display interface (20) is in direct communication with the I/O card (60) is to eliminate the need for intermediate elements that can potentially corrupt data. Instead, data flows directly from the I/O card (60) to the display interface (20).

As we see in FIG. 2, wire connections (40) provide proper data conduits between the display interface (20) and the I/O card (60) of the PLC. These wire connections (40) are connected at a conventional connection point (70) as shown in FIG. 2. Data transferred through the wire connections (40) to the display interface (20) via the conventional circuit board (70) work together to provide the real-time data in their respective units of the present invention.

Figure 3:
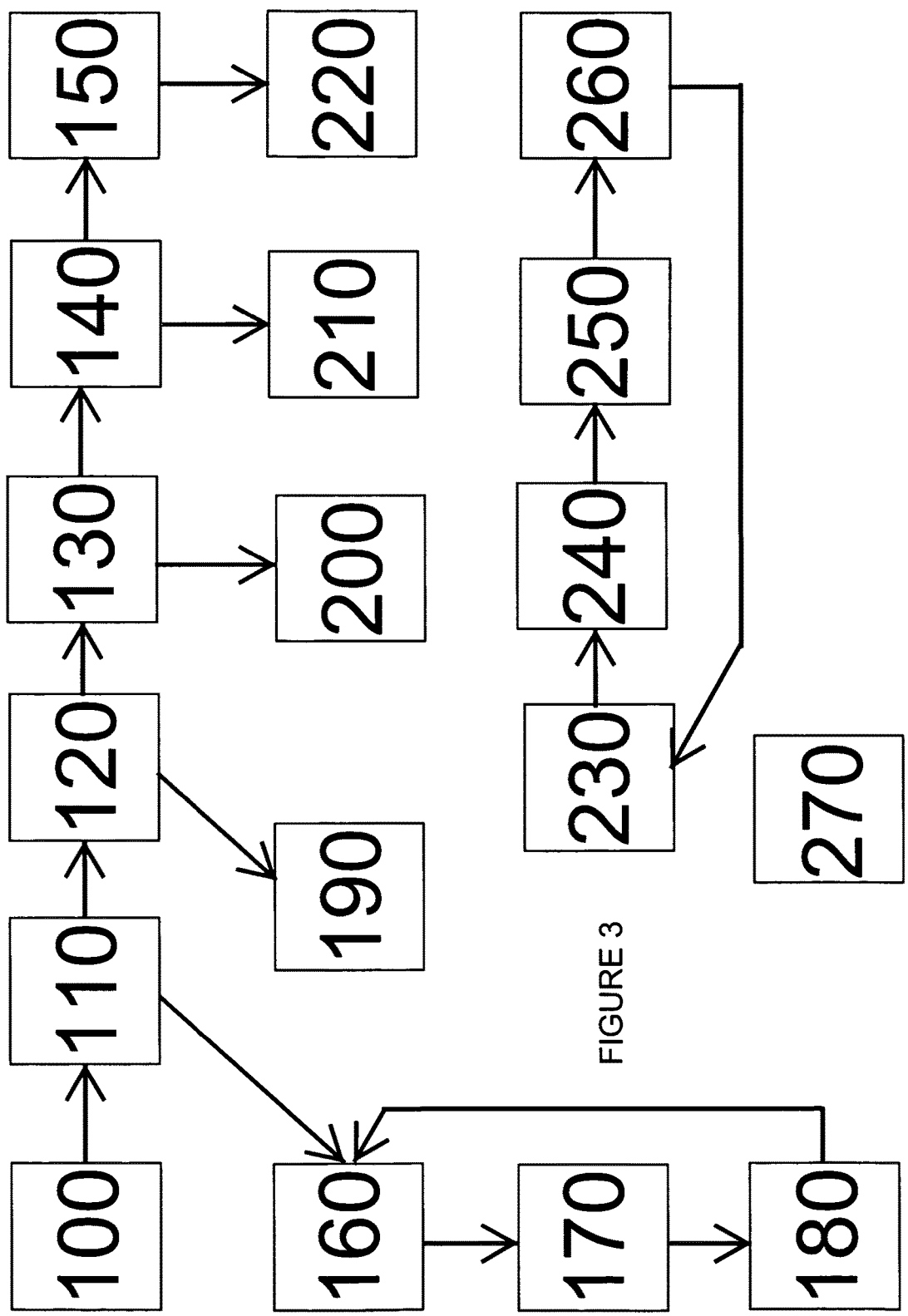
FIG. 3 is a flow chart of the workings related to the display interface (20) of the present invention.

In FIG. 3, we see a flow chart describing an embodiment of the present invention in terms of an example of how a user may scroll through an embodiment of the display interface (20) and view various elements. It is important to note that other display elements leading a user to ultimately view data in engineering units or other digital value may also be displayed in the display interface (20), and the flow chart in FIG. 3 is merely an example of an embodiment of this element.

The first item a user may view after the present invention is powered on is a screen stating the text, "passed self test" (100). The self test is an automatic function after initial powering up to confirm that all systems of the PLC and display interface (20) of the present invention are functioning as expected. After confirmation of "passed self test (100)," the user may hold down the panel button (30) as described in FIG. 1. When the user holds down the panel button (30), he or she will be able to cycle through the primary screens of the present invention. In order of this embodiment of the present invention if the user scrolls all the way through, he or she will see "display setup info" (I 10), "display status info" (120), "display units decimal counts" (130), "display units hex counts" (140) and "display units +/−V,mA,V" (150).

The "display status info" (120) screen may lead a user to an informational screen declaring an "end of status menu list" (190). The process of leading users to the secondary displays is as described in FIG. 1 in regard to holding the panel button (30) down until the scroll reaches the desired point. When that happens, the user may release the panel button (30) and that particular screen will have been selected, thus leading the user to a secondary display. For example, the "display units decimal counts" (130) as seen in FIG. 3 may lead a user to a secondary display featuring units in decimal counts (200). The "display units hex counts" (140) will lead a user to a secondary display showing units in hex counts (210). The "display units +/−V,mA,V" (150) may lead a user to a secondary display featuring voltage and mA units (220).

The "display setup info" (110) will lead a user to a set of auto-cycling screens that will permit the user to view various screens to display information relating to the setup and propagation of the present invention. In FIG. 3, we see that the "display setup info" (110) may lead a user to a forward reverse screen (160), voltage and milliamp screen (170) and a channel enabler screen (180) Once the auto-scanning process completes itself in these screens, a user will again be able to view the process from the beginning.

An additional embodiment of the present invention as seen in FIG. 3 revolves around the display of error messages. An embodiment of the present invention will insert error messaging to be viewed in the display interface (20) if there is a deficiency in the PLC or overall data conversion and display process. In one embodiment of the present invention, a view will be notified on the display interface (20) whether there is a missing external 24 VDC element (230), self test fail, replace module (240) or missing configuration data (250). Since there may be multiple errors, the conclusion of the error screens scroll will display a message stating an "end of status menu list" (260). From there, the user may scroll back to the beginning of the error thread. In addition, a fault message screen (270) may appear in place of data in the event of a problematic condition. For example, an embodiment of the present invention can declare that an input signal is "over" the maximum detectable by the module or "under", meaning the voltage or current input signal is at 0. An "open" message may indicate that the input signal is less than a specified current level. A "spare" message may indicate that an input is not being used. Other alternative methods for the implementation of this concept include, but are not limited to (a) the use of an infrared (IrDA) to a handheld display thereby allowing the read device to be physically separate from the device itself; (b) the use of bluetooth or other wireless to display device(s) thereby allowing even greater range for the information to travel; (c) optical projection to translucent screen or retinal viewer(s) as an alternative display method; and (d) compact LCD or other micro-display to be read and displayed with Barcode like scanner if one wants to minimize the weight or size of the device.

The present invention should be understood to be, in a preferred embodiment, a system for displaying and monitoring practical data in controllers, comprising a display interface; and an I/O card, in communication with said display interface. Furthermore, said display interface is configured to monitor data output in a non-invasive fashion. Also, said display interface is configured to monitor data analog input data. Moreover, said display interface is configured to monitor output data. Additionally, said display interface is configured to monitor a programmable logic controller. Also, said display interface and said I/O card are in direct communication with one another. Further, said I/O card is connected to multiple sensors. Additionally, said display interface is configured to receive data in real time. Also, said display interface is configured to receive data in real time. Moreover, said display interface is configured to compile and store said data. Further, said display interface in configured to communicate with a front side bus. Also, said display interface is configured with flash memory. More still, said display interface is configured with static memory. Even further, said data is viewable as digital data counts as well as in engineering units. Additionally, said display interface is configured to allow multiple channels to be viewed simultaneously. Also, said display interface is configured to allow a data channel, being viewed, to be changed with the press of a single button. Further, said single button is configured to manipulate said display interface by holding down said single button or releasing said single button at the appropriate intervals to allow a user to view data required. Also, said display interface and said I/O card are in direct communication with one another non-invasively.

In another embodiment of the present invention, the present invention is a monitoring device; a programmable logic controller, in communication with said monitoring device; a real-time and direct interface between in and out leads of data channels from multiple sensors in said programmable logic controller; wherein said monitoring device is in direct communication with said programmable logic controller; and wherein said monitoring device has a display, a central processing unit, a front side bus, a data storage means allowing data to be viewed by a user in digital data counts and engineering units of said data channels simultaneously and manipulated through the use of a single button press.

The present invention can also have a remote interface that has analysis programming which automatically alerts a human (via a connection to a telephone or an instant message client) if certain preset parameters are met.

It should be noted that all methods of connections and interfaces are conventional to one skilled in the art. If not specifically mentioned, any and all connections and interfaces done via any and all conventional means appropriate to one skilled in the art.

It should be understood that the present invention is not solely limited to the embodiments described above, but is any and all of the embodiments within the scope of the following claims.

We claim:

1. A method for monitoring practical data of controllers of an automation system by a programmable logic controller (PLC), comprising:

converting, by an I/O card, practical data output received from sensors of the automation system into a digital data;

arranging the I/O card to be in direct communication with a display interface without connecting to a central processing unit of the PLC by connecting the I/O card and the display interface directly via a circuit board with wire connection without any other intermediate elements;

transmitting, by the I/O card, converted practical data output to a central processing unit of the PLC and a display interface;

displaying non-invasively, by the display interface, the converted practical data output in real-time by directly connecting the I/O card with the sensors built into the automation system employing engineering units or digital counts such that user can monitor the practical data output via the display interface, wherein parts of the automation system are remained in the automation system during the direct connection and are not taken out to be transferred to an external monitoring device for determining whether the automation system is running property;

preventing corrupted and skewed data from being displayed on the display interface by not employing additional use of meters, cables, device connections, sensors, and switches between the directly connected display interface, I/O card, and the sensors built into the automation system, and further wherein the practical data corruption is prevented by central processing unit of the PLC not engaging in the connection between the display interface and the I/O card;

scrolling, by clicking and holding a button of the display interface, various menu options displayed on the display interface to determine and view the desired practical data output by the user in a different unit or count; and displaying the practical data output in the different unit or count by releasing the button of the display interface by the user when the corresponding menu option is selected during the scrolling.

* * * * *